United States Patent
Makio et al.

[11] Patent Number: 6,047,010
[45] Date of Patent: *Apr. 4, 2000

[54] SECOND HARMONIC GENERATOR AND LASER APPLIED UNITS

[75] Inventors: Satoshi Makio; Tsuyoshi Miyai, both of Kumagaya; Yasunori Furukawa; Masayoshi Sato, both of Fukaya, all of Japan

[73] Assignee: Hitachi Metals, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/598,846

[22] Filed: Feb. 9, 1996

[30] Foreign Application Priority Data

Feb. 9, 1995 [JP] Japan ............ 7-021612

[51] Int. Cl.$^7$ ............ H01S 3/10
[52] U.S. Cl. ............ 372/22; 372/20; 372/23; 372/24; 372/34; 372/98; 372/99; 372/41; 372/105
[58] Field of Search ............ 372/39, 40, 66, 372/21, 22, 24, 98, 34, 32, 92, 41, 23, 105, 99

[56] References Cited

U.S. PATENT DOCUMENTS

| | | | |
|---|---|---|---|
| 3,943,210 | 3/1976 | Yarbourough et al. | 372/101 |
| 4,260,957 | 4/1981 | Congleton et al. | |
| 4,727,552 | 2/1988 | Porte et al. | 372/105 |
| 5,105,434 | 4/1992 | Krupke et al. | 372/20 |
| 5,197,073 | 3/1993 | Oka | 372/22 |
| 5,237,636 | 8/1993 | Harada | 372/22 |
| 5,249,189 | 9/1993 | Scheps | 372/20 |
| 5,249,190 | 9/1993 | Kortz et al. | 372/22 |
| 5,251,059 | 10/1993 | Kouta | 359/326 |
| 5,274,652 | 12/1993 | Senoh et al. | 372/22 |
| 5,287,373 | 2/1994 | Rapoport et al. | 372/66 |
| 5,289,479 | 2/1994 | Oka et al. | 372/22 |
| 5,383,209 | 1/1995 | Hwang | 372/34 |
| 5,432,807 | 7/1995 | Okazaki et al. | 372/22 |
| 5,446,750 | 8/1995 | Ohtsuka et al. | 372/22 |
| 5,452,312 | 9/1995 | Yamamoto et al. | 372/22 |
| 5,588,014 | 12/1996 | Okazaki et al. | 372/22 |

FOREIGN PATENT DOCUMENTS

| | | |
|---|---|---|
| 0 457 590 A2 | 11/1991 | European Pat. Off. |
| 0 457 590 B1 | 1/1995 | European Pat. Off. |
| 69106 581 T2 | 5/1995 | Germany |
| 4-25087 | 1/1992 | Japan |
| 4-82282 | 3/1992 | Japan |
| 4-251226 | 4/1992 | Japan |
| 4-318990 | 11/1992 | Japan |
| 6-110095 | 4/1994 | Japan |
| 7-92578 | 9/1995 | Japan |

OTHER PUBLICATIONS

I. Kuroda et al., Development of Nonlinear Crystal CLBO, Extended Abstracts (The 55th Autumn Meeting (1994)), The Japan Society of Applied Physics, No. 3, p. 879, (Sep. 19, 1994) and translation.

K. Kato, Tunable UV Generation to $0.185\beta m$ in $CsB_3O_5$, Extended Abstracts (The 55th Autumn Meeting (1994)), The Japan Society of Applied Physics, No. 3, p. 880, (Sep. 19, 1994) and translation.

Characteristics of Etalon, Laser Handbook, The Laser Society of Japan, p. 351 (Dec. 15, 1982) and translation.

*Primary Examiner*—Leon Scott, Jr.
*Attorney, Agent, or Firm*—Staas & Halsey

[57] ABSTRACT

A second harmonic generator comprising a semiconductor laser as an excitation light source and a resonator having a solid laser crystal excited by the excitation light source, a control element for controlling the wavelength of a first oscillation wave generated from the solid laser crystal and a nonlinear crystal for wavelength converting the first oscillation wave as a fundamental wave into a second harmonic wave as a second oscillation wave, wherein the components of the resonator are arranged in the order of a first laser mirror, solid laser crystal, wavelength control element, nonlinear crystal and second laser mirror from the input side of the excitation light.

21 Claims, 5 Drawing Sheets

SECOND HARMONIC GENERATOR AND LASER APPLIED UNITS

BACKGROUND OF THE INVENTION

1. Field of the Invention

This invention relates to an optoelectronic field and, more specifically, to a visible laser light source and laser applied units employing a visible laser light source, such as a laser printer, fine particle detector, optical shaping unit, optical recorder and the like.

2. Related Art

With the progress of the advanced information communication age, demand for adaptation to short wavelengths is arising to meet requirements for improved recording density and high-speed printing in an optical recording field such as optical disk drives and laser printers. However, as light sources capable of providing a blue color range (wavelength of 400 to 480 nm) which is in high demand for commercialization, only gas lasers such as He—Cd (helium-cadmium) and Ar (argon) lasers are available, which have been unsuitable for use in optical disk drives, for example, because they are bulky and power consuming. Although the above gas lasers are actually incorporated in some laser printers as a light source, there is the possibility that they will be an obstacle to future reductions in the size and power consumption of laser printers for the above reason.

To overcome the above problem, technology which makes use of second harmonic generation (to be abbreviated as "SHG" hereinafter) to reduce wavelength is proposed. Progress has been made in studies on technology for practical application of this SHG light source along with an increase in the output of a semiconductor laser. The scene behind this is that discharge is not necessary for this SHG light source unlike conventional gas lasers, there is the possibility that (1) the size and (2) power consumption of the SHG light source will be reduced, and the SHG light source has high reliability depending on the output stability and long service life of an excitation semiconductor laser ((3) output stability and (4) long service life).

There is also proposed a method for obtaining blue radiation 12 as a second oscillation wave, that is, an SHG wave, from an SHG light source having the same output wavelength as that of the afore-mentioned gas laser, for example, wherein the output of a semiconductor laser 1 generating near infrared light as shown in FIG. 10 is taken as a first oscillation wave, that is, a fundamental wave, and resonated in a monolithic external resonator 44 which is composed of a nonlinear crystal (W. J. Kozlovsky and W. Lenth, "Generation of 41 mW of blue radiation by frequency doubling of a GaAlAs diode laser", Appl. Phys. Lett., Vol.56 No.23, p.2291, 1990). The nonlinear optical crystal (to be referred to as "SHG crystal" because wavelength conversions hereinafter are all for SHG) is KN ($KNbO_3$: potassium niobate).

However, the above SHG light source involves the following advanced technical problems. One of them is that it is necessary to adjust the oscillation wavelength of the semiconductor laser 1 which is easily affected by disturbance to a wavelength at which the SHG conversion efficiency of a KN crystal becomes maximal. For this purpose, an optical isolator 42 must be inserted to protect the semiconductor laser from light reflected by the KN crystal. Another problem is that reflected light from the resonator must be received by an optical detector 45 to control the length of an external resonator including the KN crystal in the order of the wavelength of the fundamental wave and the electrical output of the optical detector 45 is supplied to a feedback circuit 46 to control the output of the semiconductor laser for stable oscillation. Therefore, it is expected to be difficult to find solutions to these technical problems for commercialization.

Means for solving the above technical problems include an intracavity doubling SHG laser system in which an oscillation wave from a solid laser is taken as a fundamental wave and an SHG crystal is arranged in the resonator of the solid laser. In other words, in the intracavity doubling SHG laser system, oscillation wavelength is rarely affected by disturbance such as the above reflected light because the resonator forming the solid laser comprises mirrors having a high reflectance for the wavelength of an oscillation wave from the solid laser arranged at both ends thereof. The intracavity doubling SHG laser system is further characterized in that SHG conversion efficiency is hardly affected by fluctuations in oscillation wavelength caused by changes in the length of a resonator in the order of wavelength resulted by temperature variations and vibrations, unlike an external resonator SHG system.

A laser using a LiSAF ($Cr:LiSrAlF_6$; chromium added lithium strontium aluminum fluoride) crystal as a laser crystal which oscillates at a wavelength of 750 to 1,000 nm has recently been proposed as a semiconductor laser excited wavelength variable solid laser (U.S. Pat. No. 4,811,349).

The inventors of the present invention have studied a method for causing a nonlinear crystal to generate SHG light having a blue color range as a second oscillation wave, using laser light from this semiconductor laser excited LiSAF crystal as a first oscillation wave (fundamental wave), and found two new problems involved.

FIG. 9 is a structural diagram for second harmonic generation by a LiSAF crystal and a nonlinear crystal. A first laser mirror 3 formed of a dielectric multi-layer film reflecting 99% or more of a fundamental wave oscillated from the LiSAF crystal 4 and transmitting excitation light is formed on the surface of the LiSAF crystal 4 where excitation light 11 from a semiconductor laser (unshown) is input and a laser resonator is formed between the first laser mirror and a second laser mirror 7 as a curvature mirror arranged on the output side thereof. The resonator has therein an SHG crystal 6 and a birefringent crystal 5 which is an element for controlling the wavelength of the fundamental wave and SHG light is output from the second laser mirror 7. The second laser mirror 7 is coated with a coating to reflect 99% or more of the fundamental wave and transmit SHG light.

The first problem in the structure of FIG. 9 is that it is impossible to generate SHG light efficiently because the beam waist of a resonator beam 32 of the generated fundamental wave is located at the first laser mirror 3 on the LiSAF crystal 4 and is large in diameter at the 15 nonlinear crystal 6 for generating SHG light. This is because SHG conversion efficiency generally depends on the beam diameter of the fundamental wave within the nonlinear crystal and the smaller the beam diameter, the more efficiently the SHG light can be generated.

The second problem is that part of SHG light 31 is reflected by the birefringent crystal which is a wavelength control element 5 because the SHG light generated by the nonlinear crystal crosses the polarization direction of the fundamental wave at a right angle. This is because the birefringent crystal transmits the fundamental wave because it is inclined at the Brewster angle with respect to the polarization of the fundamental wave, but has a low transmittance for the polarization of SHG light.

SUMMARY OF THE INVENTION

It is therefore an object of the invention to solve the above problems.

Another object of the invention is to provide a small-sized, high-efficiency second harmonic generator.

A further object of the invention is to provide a second harmonic generator comprising a semiconductor laser as an excitation light source and a resonator having a solid laser crystal excited by the excitation light source, a control element for controlling the wavelength of a first oscillation wave generated from the solid laser crystal and a nonlinear crystal for wavelength converting the fundamental wave as the first oscillation wave into a second harmonic wave as a second oscillation wave, wherein the components of the resonator are arranged in the order of a first laser mirror, solid laser crystal, wavelength control element, nonlinear crystal and second laser mirror from the input side of excitation light.

A still further object of the invention is to provide a small-sized high-efficiency second harmonic generator wherein, in an intracavity doubling SHG laser system using a wavelength variable laser, particularly a LiSAF laser crystal, the components of a resonator are arranged in the order of a first laser mirror, laser crystal, wavelength control element, SHG crystal and second laser mirror from the side of excitation light, so that the beam waist of a fundamental wave is located within the SHG crystal and generated SH light is output without being interfered by the wavelength control element, as well as an SHG light source stabilized by controlling the temperature of the entire resonator.

Other objects and advantages of the present invention will become more apparent from the following description with reference to the accompanying drawings.

DETAILED DESCRIPTION OF THE PREFERRED EMBODIMENT

The inventors have found that the above problems can be solved by specifying a combination of components of the resonator for generating SHG light. The present invention is predicated upon this finding.

In other words, the present invention is a second harmonic generator comprising a semiconductor laser as an excitation light source and a resonator having a solid laser crystal excited by the excitation light source, a control element for controlling the wavelength of a first oscillation wave generated from the solid laser crystal and a nonlinear crystal for wavelength converting the first oscillation wave as a fundamental wave into a second harmonic wave as a second oscillation wave, wherein the components of the resonator are arranged in the order of a first laser mirror, solid laser crystal, wavelength control element, nonlinear crystal and second laser mirror from the input side of the excitation light.

When the components of the resonator are arranged in the order of the first laser mirror, solid laser crystal, wavelength control element, nonlinear crystal and second laser mirror from the input side of the excitation light source, the beam waist of the fundamental wave in the resonator can be located at the nonlinear crystal and a second harmonic wave can be generated efficiently.

When the first laser mirror is a curvature mirror which transmits 85% or more of the excitation light and reflects 99% or more of the first oscillation wave and the second laser mirror is a plane mirror which reflects 99% or more of the first oscillation wave and transmits 85% or more of the second oscillation wave, it is possible to reduce a loss in the resonator and further generate the second harmonic wave efficiently.

Moreover, the second laser mirror may be formed on one surface of the nonlinear crystal.

When a LiSAF ($Cr:LiSrAlF_6$: chromium added lithium strontium aluminum fluoride) crystal is used as the above solid laser crystal, the first oscillation wave having a wavelength of 800 to 900 nm and the second oscillation wave having a blue color range (400 to 450 nm) can be generated.

A single birefringent crystal inclined at the Brewster angle is used as the control element for controlling the wavelength of the first oscillation wave generated from the LiSAF crystal and arranged between the LiSAF crystal and the nonlinear crystal to prevent reflection of SHG light as described above, thereby making it possible to reduce the loss of SHG light in the resonator and generate SHG light efficiently. When a LiSGAF ($Cr:LiSrGaF_6$; chromium added lithium strontium gallium fluoride) crystal is used as the solid laser crystal, the same effect can be obtained.

Any one of quartz ($SiO_2$), $LiNbO_3$ and $LiTaO_3$ may be used as the birefringent crystal. Preferably, a single quarts plate having a thickness of 0.4 to 3 mm may be used as the birefringent crystal.

Figure 3:
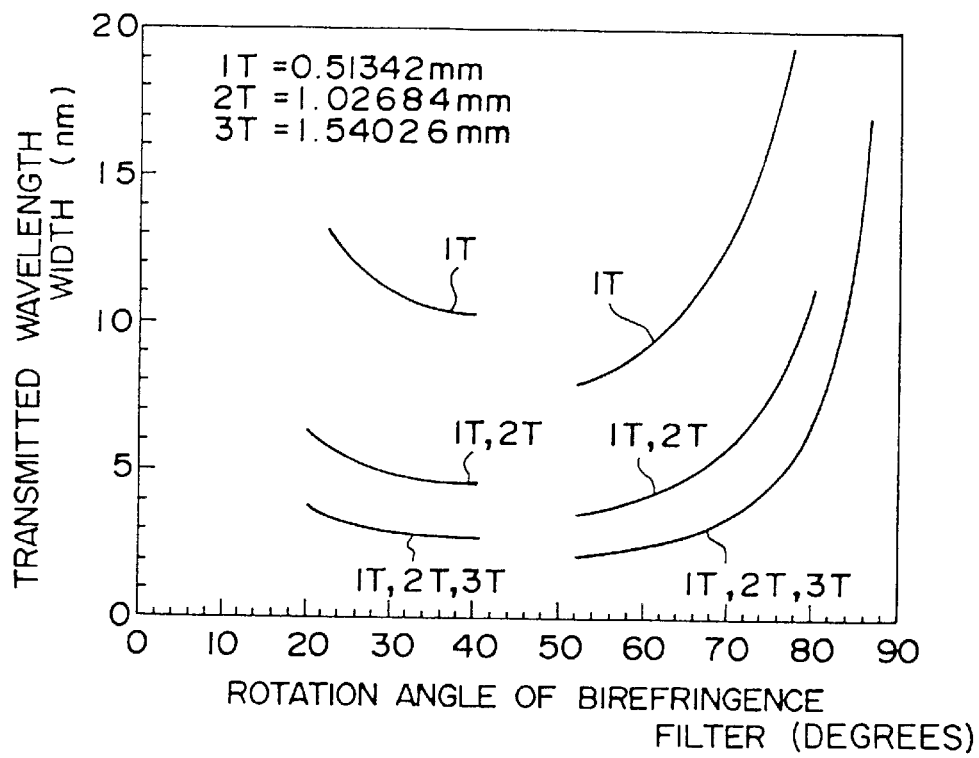
FIG. 3 is a diagram for explaining the comparison of transmission wavelength width which differs according to the number of quartz crystals of a birefringent crystal.

It is known that an oscillation threshold value in the resonator is increased by inserting into the resonator a birefringent crystal as the wavelength control element for controlling the oscillation wavelength of the solid laser crystal. This is because the oscillation characteristic of a laser resonator depends on a loss in the resonator, which is increased by inserting a birefringent crystal, and hence, a threshold value until oscillation is achieved becomes high. When the transmission wavelength width of the wavelength control element is narrow, the amount of light reflected and not transmitted by the wavelength control element increases, resulting in an increased loss and a high oscillation threshold value. FIG. 3 shows the calculation of a transmission wavelength width based on the number of quartz plates of the birefringent crystal inclined at the Brewster angle. It is understood from FIG. 3 that the transmission wavelength width is narrowed by increasing the number of quartz plates of the birefringent crystal, that is, the thickness of the birefringent crystal. Thereby it is revealed that transmission wavelength width can be expanded by reducing the thickness of the birefringent crystal, thereby making it possible to reduce the loss and the oscillation threshold value.

Figure 4:
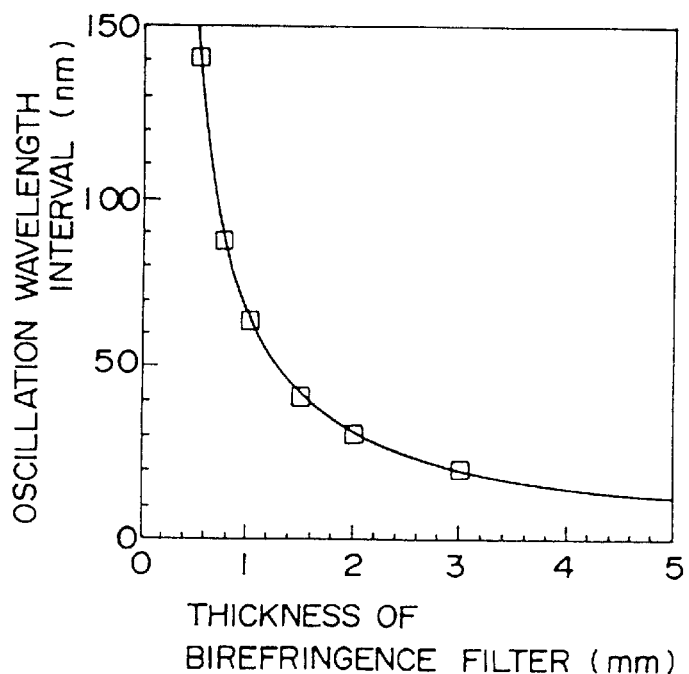
FIG. 4 is a diagram for explaining the oscillation wavelength interval with respect to the thickness of a birefringent crystal.

Further, FIG. 4 shows laser oscillation wavelength interval with respect to the thickness of the birefringent crystal when the birefringent crystal is formed of a single quarts plate. The term "laser oscillation wavelength interval" used herein denotes the interval between the wavelengths of simultaneous laser oscillations, that depends on the gain characteristic of a laser medium for each wavelength. Since, when the gain characteristic is wide, the wavelength range of possible laser oscillations is wide, simultaneous laser oscillations may occur according to the transmission wavelength interval of the wavelength control element. It is seen from FIG. 4 that the interval between the wavelengths of laser oscillations becomes narrower as the thickness of the birefringent filter increases. This is because, when the thickness is large, the interval between the adjacent wavelengths of possible laser oscillations is narrow and a laser which can oscillate at a broad bandwidth, such as a LiSAF laser, may oscillate at two or more oscillation wavelengths. Since a general laser mirror has a reflection bandwidth of 50 nm, an oscillation wavelength interval of 25 nm or more, about half the above reflection bandwidth, is required to suppress two or more simultaneous oscillations. Therefore, the thickness of the birefringent crystal needs to be 3 mm or less according to FIG. 4. Since wavelength control becomes difficult when the thickness of the crystal is too small and the oscillation wavelength width of a LiSAF laser is about 20 nm, the thickness of the crystal needs to be 0.4 mm or more according to FIG. 4. Therefore, the thickness of the birefringent crystal is preferably in the range of 0.4 to 3 mm.

Moreover, when at least one of LBO ($LiB_3O_5$), BBO ($\beta$-$BaB_2O_4$), CLBO ($CsLiB_6O_{10}$) and CBO ($CsB_3O_5$) having a relatively wide phase match half value width is used as the nonlinear optical crystal which is a SHG crystal, SHG light can be generated efficiently even when the oscillation wavelength width of the fundamental wave is wide.

Stability and size reduction can be achieved by arranging at least two of the components constituting the resonator on the same structural member and the components constituting the resonator above a temperature control element. A small-sized, power saving second harmonic generator which is characteristic of SHG system can be realized by employing these means.

(Embodiment 1)

Figure 1:
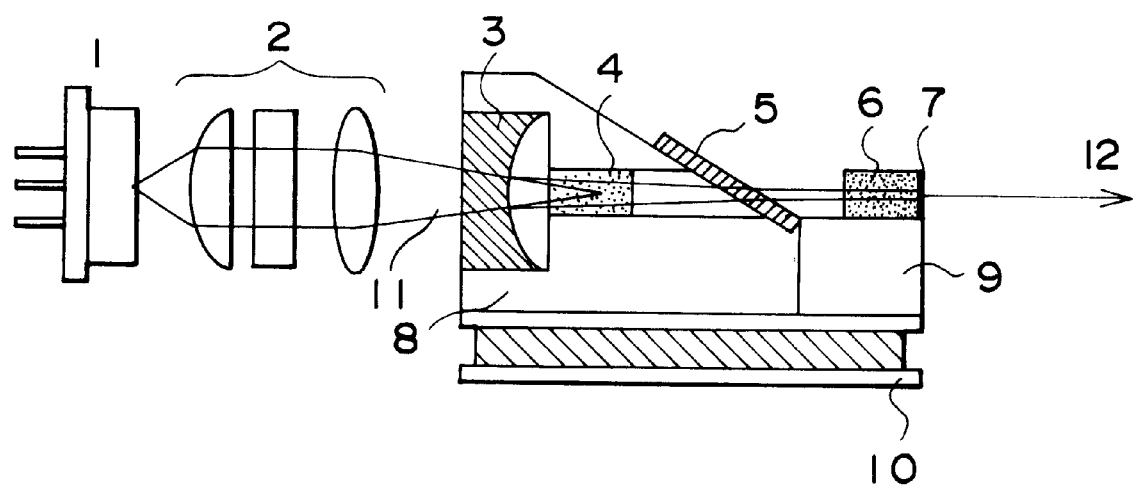
FIG. 1 is a diagram for explaining an embodiment of the invention.

FIG. 1 is a diagram for explaining an embodiment of the present invention. Excitation beams 11 radiated from a semiconductor laser 1 are converged by converging optics 2 to excite a solid laser crystal 4. An AlGaInP semiconductor laser manufactured by Spectra Diode Laboratory Co. which has an output of 500 mw and an oscillation wavelength of 670 nm is used as the semiconductor laser 1. Two cylindrical lenses and a single lens (f=30 mm) are used as the converging optics 2.

The excited solid laser crystal 4 generates a first laser beam as a fundamental wave in a laser resonator which comprises a first laser mirror 3 which is a curvature mirror on the input side and a second laser mirror 7 formed on the output end surface of an SHG crystal 6 and reflecting the first oscillation wave. In the laser resonator, the laser crystal 4, a wavelength control element 5 and the SHG crystal 6 are arranged. To the first laser mirror 3 is applied a high reflection (to be abbreviated as HR hereinafter) coating having a transmittance of 85% or more for the wavelength of excitation light from the semiconductor laser and a reflectance of 99% or more for the wavelength of the fundamental wave. In this embodiment, the resonator structure is a concave-plane type resonator, the first laser mirror 3 has a curvature radius of 25 mm, and the length of the resonator is 20 mm. A LiSAF crystal ($\phi$3×5 mm) containing 1.5 mol % of Cr is used as the laser crystal 4. To the end surface of the crystal is applied an antireflection (to be abbreviated as AR hereinafter) coating having a reflectance of 2% or less for the wavelength of excitation light and the wavelength of the fundamental wave. The SHG crystal 6 is an LBO crystal measuring 3×3×5 mm. To the output side, that is, the rear end surface of the LBO crystal are applied an HR coating having a reflectance of 99% or more for the wavelength of the fundamental wave and an AR coating having a reflectance of 1% or less for the wavelength of the SHG wave to make it the second laser mirror 7. To the input side, that is, the front end surface of the LBO crystal is applied an AR coating having a reflectance of 0.2% or less for the wavelength of the fundamental wave. A birefringent crystal made of a single quartz plate is used as the wavelength control element 5 and inclined at the Brewster angle with respect to the optical axis to turn around the optical axis so that the wavelength of the fundamental wave is controlled to a wavelength at which the conversion efficiency of the LBO crystal as the SHG crystal 6 becomes maximal. Thereby, an SHG output of 10 mW was obtained. Further, the first laser mirror 3, the laser crystal 4 and the wavelength control element 5 are installed on the same structural member 8, the SHG crystal 6 is installed on a structural member 9, and these members are fixed on a Peltier element 10 as a temperature control element to control the temperature of the entire resonator.

With this structure, the beam waist of the fundamental wave is located within the SHG crystal 6 and generated SHG light 12 is output efficiently without being interfered by the wavelength control element. The resonator is small in size and a stable SHG light source is realized by controlling the temperature of the entire resonator.

(Embodiment 2)

Figure 2:
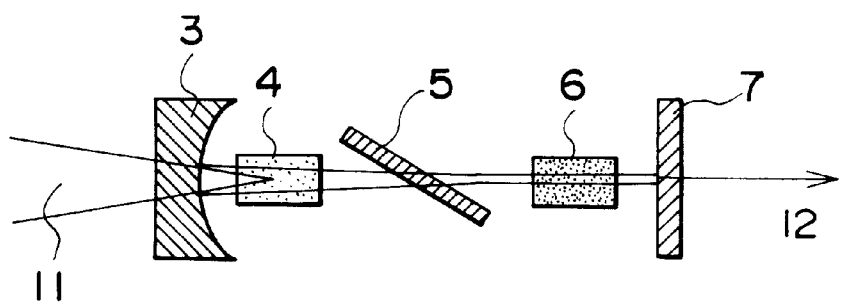
FIG. 2 is a diagram for explaining another embodiment of the invention.

FIG. 2 is a diagram of a resonator for explaining another embodiment of the present invention. Excitation optics composed of a semiconductor laser and converging optics are the same as those of Embodiment 1. An excited laser crystal 4 generates a fundamental wave as a first oscillation wave in a laser resonator which comprises a first laser mirror 3 arranged on the input side thereof as a curvature mirror and a second laser mirror 7 as a plane mirror. In the laser resonator, the laser crystal 4, an SHG crystal 6 and a wavelength control element 5 are arranged. To the curvature laser mirror as the first laser mirror 3 is applied an HR coating having a transmittance of 85% or more for the wavelength of excitation light and a reflectance of 99% or more for the wavelength of the fundamental wave. To the plane laser mirror as the second laser mirror 7 are applied an HR coating having a reflectance of 99% or more for the wavelength of the fundamental wave and an AR coating having a reflectance of 1% or less for the wavelength of SHG light. In this embodiment, the resonator structure is a concave-plane type resonator, the curvature laser mirror as the first laser mirror 3 has a curvature radius of 25 mm, and the length of the resonator is 20 mm. A LiSAF crystal ($\phi$3×5 mm) containing 1.5 mol % of Cr is used as the laser crystal 4. To both end surfaces of the crystal is applied an AR coating having a reflectance of 2% or less for the wavelength of the fundamental wave and the wavelength of excitation light. The SHG crystal 6 is an LBO crystal measuring 3×3×5 mm. To both end surfaces of the LBO crystal is applied an AR coating having a reflectance of 0.2% or less for the wavelength of the fundamental wave and 1% or less for the wavelength of the SHG light. A birefringent crystal made of a single 0.5 mm thick quartz plate is used as the wavelength control element 5 and inclined at the Brewster angle with respect to the optical axis to turn around the optical axis so that the wavelength of the fundamental wave is controlled to a wavelength at which the conversion efficiency of the LBO crystal as the SHG crystal 6 becomes maximal. Thereby an SHG output of 10 mW was obtained. Like Embodiment 1, a stable SH output was obtained by installing the components of the resonator on the same structural members to control the temperature of the entire resonator.

(Comparative Embodiment)

Figure 9:
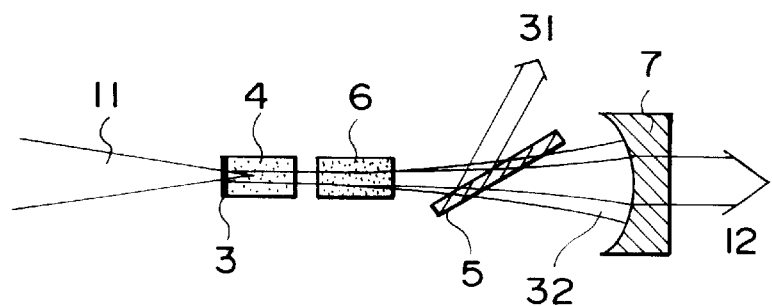
FIG. 9 is a diagram for explaining a comparative embodiment.
Figure 10:
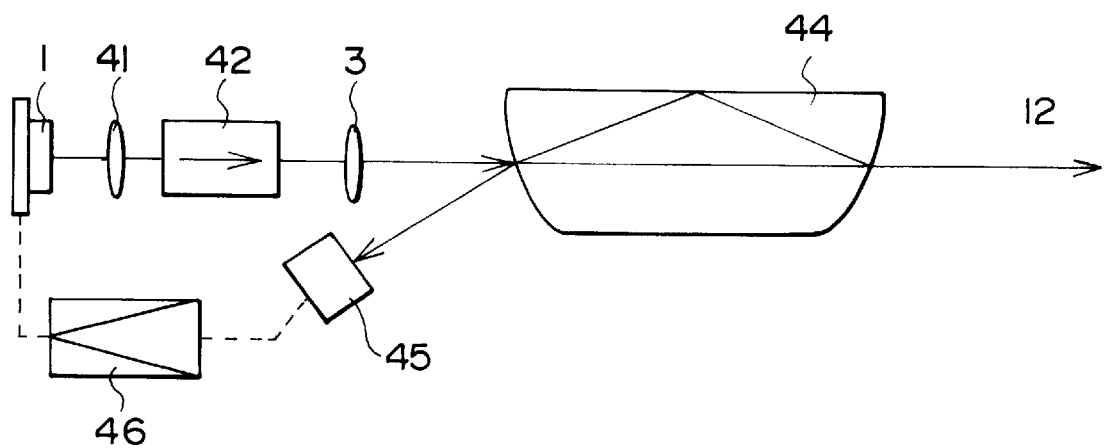
FIG. 10 is a diagram for explaining an SHG light source of the prior art.

FIG. 9 is a diagram of a resonator for explaining a comparative embodiment. Excitation optics composed of a semiconductor laser and converging optics are the same as those of Embodiment 1.

A laser crystal 4 excited by excitation beams 11 radiated from the semiconductor laser generates a fundamental wave as a first oscillation wave in a laser resonator which is formed between a first laser mirror 3 coated with an HR coating reflecting 99% or more of the fundamental wave and formed on the input side, that is, front end surface of the laser crystal 4, and a second laser mirror 7 as a curvature laser mirror coated with an AR coating reflecting 1% or less of the wavelength of the SHG wave and an HR coating reflecting 99% or more of the wavelength of the fundamental wave and arranged on the output side of the resonator.

In this embodiment, the resonator structure is a plane-concave type resonator, the curvature laser mirror as the second laser mirror 7 has a curvature radius of 25 mm, the length of the resonator is 20 mm. A LiSAF crystal (φ3×5 mm) containing 1.5 mol % of Cr is used as the laser crystal 4 and coated with an AR coating having a reflectance of 2% or less for the wavelength of the fundamental wave and the wavelength of excitation light on both end surfaces thereof. The SHG crystal 6 is an LBO crystal measuring 3×3×5 mm. To both end surfaces of the LBO crystal is applied an AR coating having a reflectance of 0.2% or less for the wavelength of the fundamental wave and 1% or less for the wavelength of the SH wave. A birefringent crystal made of a single 0.5 mm thick quartz plate is used as the wavelength control element 5 and inclined at the Brewster angle with respect to the optical axis to turn around the optical axis so that the wavelength of the fundamental wave is controlled to a wavelength at which the conversion efficiency of the LBO crystal as the SHG crystal 6 becomes maximal. However, the beam waist of the resonance beam 32 of the fundamental wave is located at the laser mirror of the LiSAF crystal 4, the beam diameter is large at the nonlinear optical crystal 5 for generating SHG light, and part of the SHG light is reflected by the birefringent crystal as the wavelength control element. As the result, an SHG output of only 5 mW was obtained.

(Embodiment 3)

Figure 5:
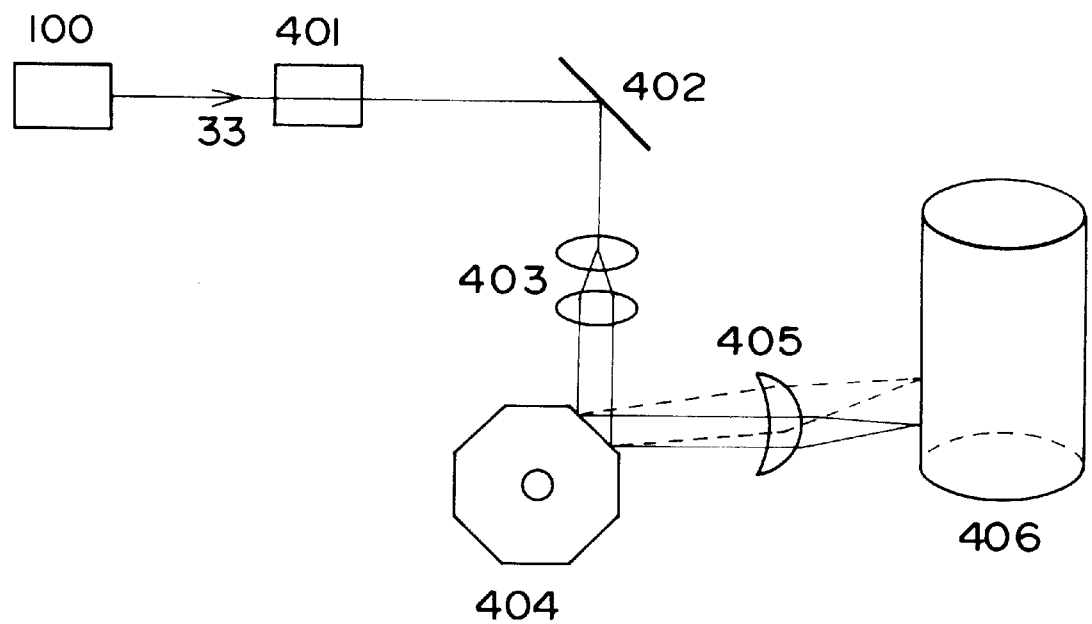
FIG. 5 is a diagram for explaining a laser printer according to an embodiment of the invention.

FIG. 5 is a diagram for explaining an application example in which the present invention is applied in a laser printer. SHG output 33 radiated from the second harmonic generator 100 described in Embodiment 1 passes through an acousto-optical (to be abbreviated as AO hereinafter) modulator 401, a reflection mirror 402, a beam expander 403, a rotary polygon mirror 404 and an fθ lens 405, and is converged upon a photosensitive drum 406. The AO modulator 401 modulates the SHG output 33 according to image information, and the rotary polygon mirror 404 scans in a horizontal direction (of the paper of the drawing).

With this combination, secondary information is recorded on the photosensitive drum 406 as partial potential differences. The photosensitive drum 406 turns, adhered by toner according to the potential differences, and reproduces information on recording paper.

(Embodiment 4)

Figure 6:
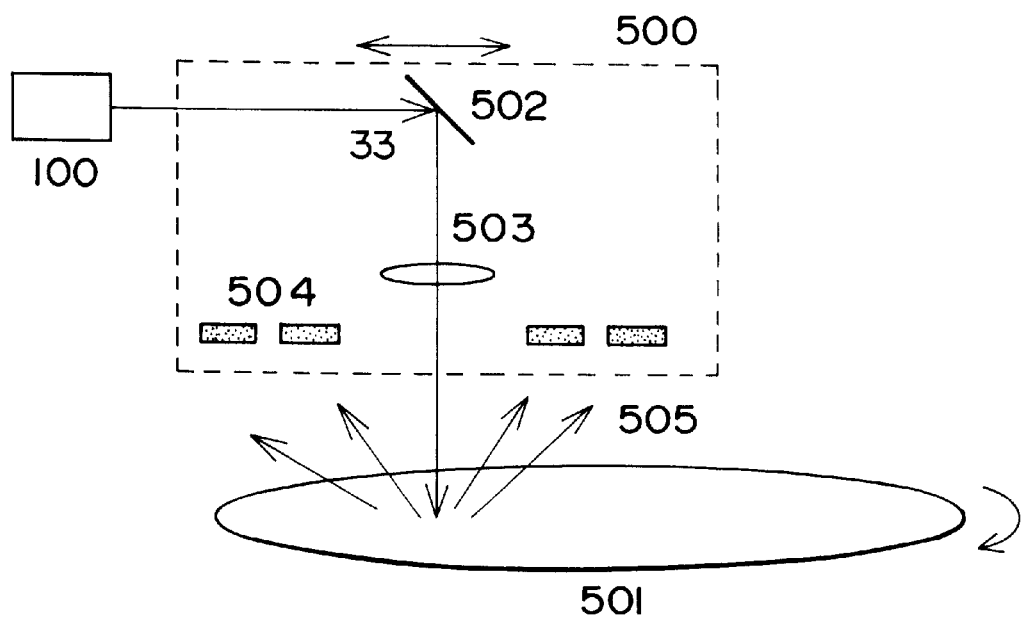
FIG. 6 is a diagram for explaining a fine particle detector according to an embodiment of the invention.

FIG. 6 is a diagram for explaining a detector for detecting fine particles on a Si wafer as an application example in which the present invention is applied in a fine particle detector. SHG output 33 radiated from the second harmonic generator 100 described in Embodiment 1 is input into an optical head 500, converged up to a diffraction limit by a reflection mirror 502 and a converging lens 503 and radiated onto the Si wafer 501. Light beams 505 scattered from light converged up to a wavelength order of 0.4 μm are received by an optical detector 504, their intensities are recorded, and the optical head 500 moves from a central portion to an end portion of the Si wafer 501, whereby the distribution of fine particles on the Si wafer is measured. Fine particles having a diameter up to 1/10 the wavelength of the SHG wave can be detected.

(Embodiment 5)

Figure 7:
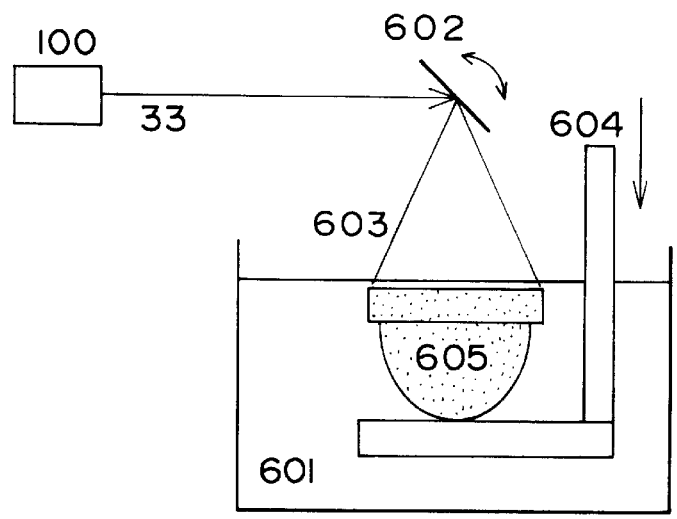
FIG. 7 is a diagram for explaining an optical shaping unit according to an embodiment of the invention.

FIG. 7 is a diagram for explaining an application example in which an embodiment of the present invention is applied in an optical shaping unit. The second harmonic generator 100 described in Embodiment 1 is used as a light source. A blue curing resin 601 is charged into a container and SHG output 33 radiated from the second harmonic generator 100 described in Embodiment 1 is caused by a mirror 602 to scan the surface of a liquid two-dimensionally. At this point, only a surface portion of the blue curing resin 601 that absorbs light cures. After the formation of one layer is completed, an elevator 604 falls to form the next layer continuously. With this operation, a solid model 605 having a desired shape can be formed.

(Embodiment 6)

Figure 8:
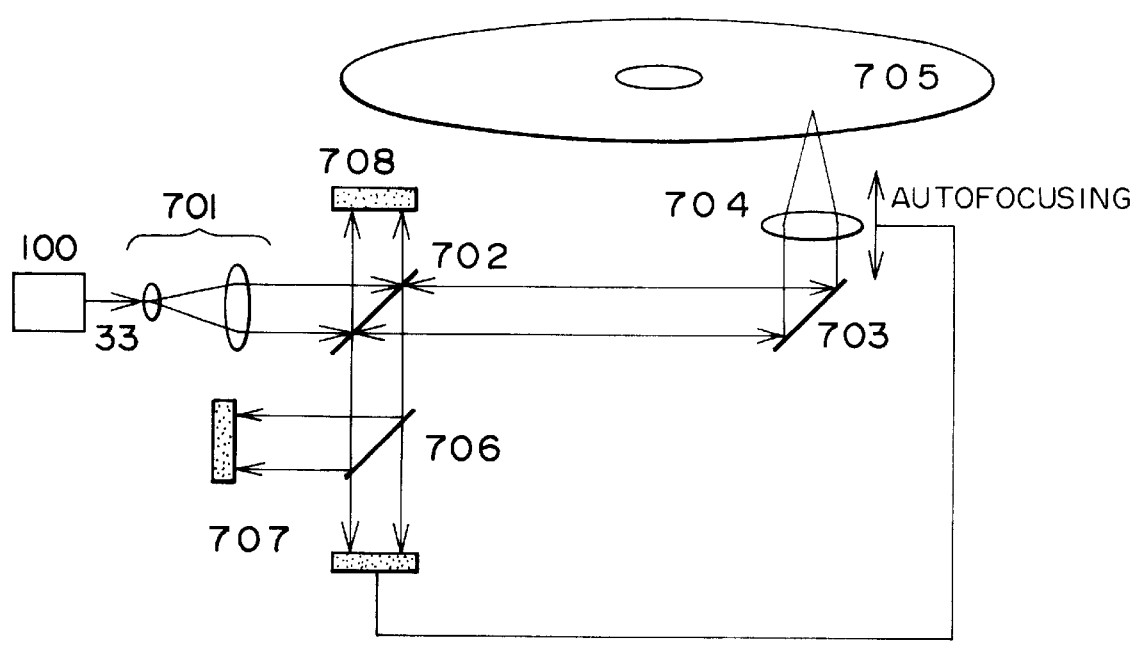
FIG. 8 is a diagram for explaining an optical recorder according to an embodiment of the invention.

FIG. 8 is a diagram for explaining an application example in which an embodiment of the present invention is applied in an optical recorder. An optical disk drive of opto-magneto recording system is used. An SHG laser beam 33 radiated from the second harmonic generator 100 described in Embodiment 1 is expanded by a beam expander 701 and then becomes parallel beams. Part of the beams reflected by a beam splitter 702 are received by a photo detector 708 for front monitoring to monitor the SHG laser beam 33 so as to control output. The beams passing through the beam splitter 702 are converged upon a medium 705 by a converging optic 704. Reflected light is partially reflected by the beam splitter 702 and divided by a beam splitter 706 into two beams which are then received by two photo detectors 707 to perform autofocusing and signal detection. A fixed magnetic field is applied to the medium 705, the SHG laser beam 33 is modulated and the focusing temperature is raised to a Curie temperature of the medium 705 to reverse magnetization for recording. When the laser beam is on, recording is made by reversing the magnetization of the medium. The recording frequency is set to 10 MHz. At the time of signal reproduction, the same SHG laser beam is used to obtain a well reproduced signal.

According to the present invention, in an intracavity doubling SHG laser system using a wavelength variable laser, particularly a LiSAF laser crystal, the components of the resonator are arranged in the order of the first laser mirror, laser crystal, wavelength control element, SHG crystal and second laser mirror from the input side of excitation light. As the result, the beam waist of the fundamental wave is located within the SHG crystal, generated SHG light is output without being interfered by the wavelength control element, and a small-sized high-efficiency second harmonic generator can be realized. Further, a stable SHG light source is implemented by controlling the temperature of the entire resonator.

While preferred embodiments of the invention have been described, it is to be understood that the invention is not limited thereto but may be otherwise variously embodied within the scope of the following claims.

What is claimed is:

1. A second harmonic generator comprising:
    a semiconductor laser to emit an excitation light; and
    a resonator having:
        a chromium-added lithium strontium aluminum fluoride laser crystal excited by the excitation light to thereby generate a linearly polarized first oscillation wave serving as a fundamental wave travelling along an optical axis and having a bandwidth centered at a selectable wavelength,
        a wavelength selecting element to receive the first oscillation wave as the fundamental wave travels along the optical axis, the wavelength selecting element being inclined at a Brewster angle with respect to the optical axis of the received fundamental wave and rotationally positioned to select a specified wavelength for the wavelength of the bandwidth of the first oscillation wave, the wavelength selecting element outputting the first oscillation wave,
        a nonlinear optical crystal to receive the first oscillation wave from the wavelength selecting element and convert the first oscillation wave into a second harmonic wave serving as a second oscillation wave, and
        a laser mirror to transmit the second oscillation wave received from the nonlinear optical crystal and to reflect the fundamental wave.

2. The second harmonic generator according to claim 1, wherein said first laser mirror is a curvature mirror which transmits 85% or more of the wavelength of the excitation light source and reflects 99% or more of the first oscillation wave, and said second laser mirror is a plane mirror which reflects 99% or more of the first oscillation wave and transmits 85% or more of the second oscillation wave.

3. The second harmonic generator according to claim 1, wherein said second laser mirror is formed on one surface of said nonlinear crystal.

4. The second harmonic generator according to claim 1, wherein at least one of LBO ($LiB_3O_5$), BBO ($\beta\text{-}BaB_2O_4$), CLBO ($CsLiB_6O_{10}$) and CBO ($CsB_3O_5$) is used as said nonlinear optical crystal.

5. The second harmonic generator according to claim 1, wherein at least two of the components constituting said resonator are arranged on the same structural member.

6. The second harmonic generator according to claim 1, wherein the components constituting said resonator are arranged above a temperature control element.

7. A second harmonic generator according to claim 1, further comprising an initial laser mirror to transmit excitation light received from the semiconductor laser and reflect a fundamental wave, wherein one of the laser mirrors is a planar mirror and the other of the laser mirrors has a curvature.

8. A second harmonic generator according to claim 1, further comprising:
    a photosensitive drum; and
    a scanning mechanism for receiving the second oscillation wave and selectively scanning the second oscillation wave over the photosensitive drum.

9. A second harmonic generator according to claim 1, further comprising:
    a semiconductor wafer; and
    a detector mechanism for receiving the second oscillation wave, selectively directing the second oscillation wave to the semiconductor wafer and recording intensities of light beams scattered from the semiconductor wafer.

10. A second harmonic generator according to claim 1, further comprising:
    a resin; and
    a scanning apparatus for receiving the second oscillation wave and selectively scanning the resin.

11. A second harmonic generator according to claim 1, further comprising:
    a magnetic recording medium; and
    a recorder mechanism for receiving the second oscillation wave and selectively focusing the second oscillation wave on the magnetic recording medium to selectively increase the temperature of the magnetic recording medium.

12. A second harmonic generator according to claim 1, wherein the first oscillation wave produced by the solid laser crystal is linearly polarized light, and wherein said wavelength selecting means is arranged between said solid laser crystal and said nonlinear optical crystal.

13. A second harmonic generator according to claim 12, wherein said wavelength selecting means comprises a birefringent crystal, the wavelength bandwidth of the selected oscillation wave output by the birefringent crystal being determined by the thickness thereof.

14. A second harmonic generator comprising:
    a semiconductor laser to emit an excitation light; and
    a resonator having:
        a tunable-oscillation solid laser gain element excited by the excitation light and generating therefrom a first oscillation wave having a predetermined polarization and a tunable bandwidth;
        a wavelength selecting element disposed on an optical axis of said resonator, inclined at Brewster's angle with respect to the optical axis, and receiving the first oscillation wave therealong, the wavelength selecting element positioned at a selected rotational position to select a specified wavelength for the bandwidth of the first oscillation wave, thereby tuning the bandwidth thereof to a central wavelength at the specified wavelength,
        a nonlinear optical crystal receiving the first oscillation wave from the wavelength selecting element and convert the first oscillation wave into a second harmonic wave serving as a second oscillation wave, and
        a laser mirror to transmit the second oscillation wave received from the nonlinear optical crystal and to reflect the first oscillation wave.

15. A second harmonic generation resonator according to claim 14, wherein the solid laser gain element is a chromium-added laser crystal.

16. A second harmonic generation resonator according to claim 15, wherein the chromium-added laser crystal is selected from chromium-added lithium strontium aluminum fluoride and chromium-added lithium strontium gallium fluoride.

17. A second harmonic generation resonator driven by a semiconductor laser emitting an excitation light, said resonator comprising:
    a solid laser crystal capable of maintaining plural simultaneous laser oscillations with respective discrete oscillation wavelength widths separated by a selectable laser oscillation wavelength interval, said solid laser crystal generating a linearly polarized first oscillation wave along an optical axis of said resonator and responsive to excitation by the excitation light;

a nonlinear optical crystal receiving the first oscillation wave and converting the first oscillation wave into a second harmonic wave as a second oscillation wave;

a laser mirror having a reflection bandwidth selected to transmit the second oscillation wave received from the nonlinear optical crystal and to reflect the first oscillation wave; and a wavelength selecting element disposed on the optical axis, inclined at Brewster's angle with respect thereto, and positioned between said solid laser crystal and the nonlinear optical crystal, said wavelength selecting element having a thickness selected to provide for said solid laser crystal an oscillation wavelength interval at least about one-half the reflection bandwidth of said laser mirror, whereby the first oscillation wave is controlled to oscillate with a single oscillation wavelength width.

18. A second harmonic generation resonator according to claim 17, wherein said solid laser crystal is a chromium-added laser crystal.

19. A second harmonic generation resonator according to claim 18, wherein the chromium-added laser crystal is selected from a chromium-added lithium strontium aluminum fluoride crystal and a chromium-added lithium strontium gallium fluoride crystal.

20. A second harmonic generation resonator according to claim 17, wherein said nonlinear optical crystal comprises at least one of $LiB_3O_5$, $\beta\text{-}BaB_2O_4$, $CsLiB_6O_{10}$, and $CsB_3O_5$.

21. A second harmonic generator comprising:

a semiconductor laser emitting an excitation light; and a resonator having:

a solid laser crystal capable of maintaining plural simultaneous laser oscillations with respective discrete oscillation wavelength widths separated by a selectable laser oscillation wavelength interval, said solid laser crystal generating a linearly polarized first oscillation wave along an optical axis of said resonator and responsive to excitation by the excitation light;

a nonlinear optical crystal receiving the first oscillation wave and converting the first oscillation wave into a second harmonic wave as a second oscillation wave;

a laser mirror having a reflection bandwith selected to transmit the second oscillation wave received from the nonlinear optical crystal and to reflect the first oscillation wave; and a wavelength selecting element disposed on the optical axis, inclined at Brewster's angle with respect thereto, and positioned between the solid laser crystal and the nonlinear optical crystal, said wavelength selecting element having a thickness selected to provide for said solid laser crystal an oscillation wavelength interval at least about one-half the reflection bandwidth of said laser mirror, whereby the first oscillation wave is controlled to oscillate with a single oscillation wavelength width.

* * * * *

UNITED STATES PATENT AND TRADEMARK OFFICE
CERTIFICATE OF CORRECTION

PATENT NO.: 6,047,010
DATED : April 4, 2000
INVENTOR(S): Satoshi Makio, et al.

It is certified that error appears in the above-identified patent and that said Letters Patent is hereby corrected as shown below:

Title Page, OTHER PUBLICATIONS
after "K. Kato, Tunable UV Generation to", change "0.185βm" to -- 0.1855μm--.

Column 4, line 48, change "quarts" to --quartz--.

Column 5, line 8, change "quarts" to --quartz--;
line 54, change "mw" to --mW--.

Column 12, line 33, ADD (claim 22) --The second harmonic generator according to claim 21, wherein said solid laser crystal is LiSAF (Cr:LiSrAlF$_6$; chromium added lithium strontium aluminum fluoride) or LiSGAF (Cr:LiSrGaF$_6$; chromium added lithium strontium gallium fluroride)--.

Signed and Sealed this

Twenty-fourth Day of April, 2001

*Attest:*

NICHOLAS P. GODICI

*Attesting Officer*   *Acting Director of the United States Patent and Trademark Office*